Jan. 27, 1931.  R. E. GARRETT  1,790,006
WHEEL SCRAPER
Filed June 17, 1929

Inventor
Raymond E. Garrett
By Bair, Freeman & Sinclair
Attorneys

Witness
Denton Read.

Patented Jan. 27, 1931

1,790,006

UNITED STATES PATENT OFFICE

RAYMOND E. GARRETT, OF SIGOURNEY, IOWA

WHEEL SCRAPER

Application filed June 17, 1929. Serial No. 371,565.

The object of this invention is to provide an improved wheel scraping attachment for traction wheels, which attachment is applicable to wheels equipped with the ordinary spade type of traction lugs.

A further object of the invention is to provide an improved wheel scraper for traction wheels which is provided with a frangible connection to permit the scraper to move out of operation position when it encounters an obstruction on the wheel.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1:
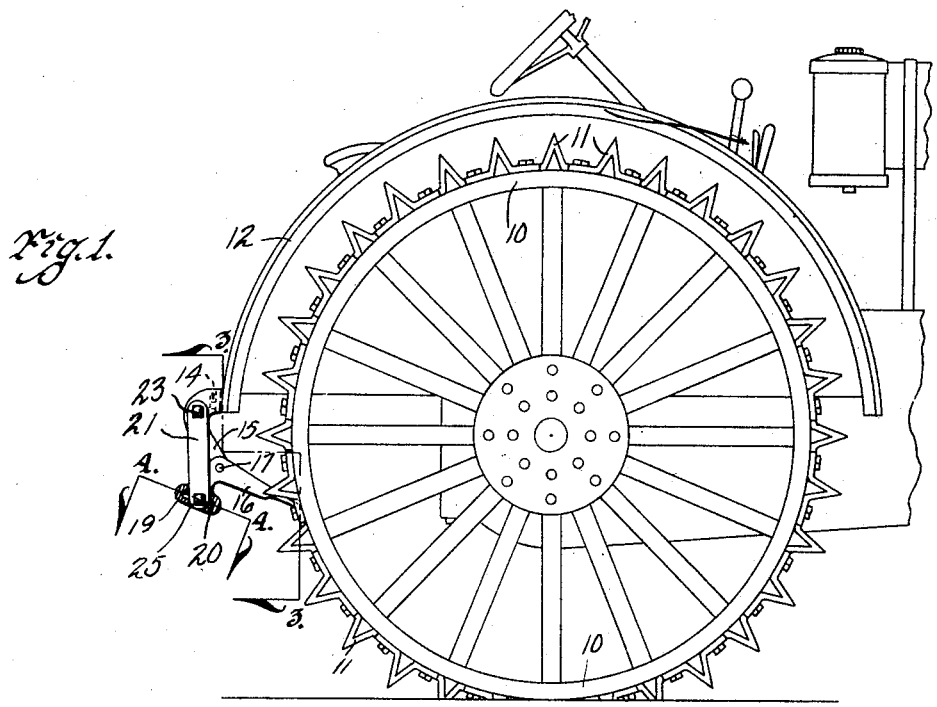
Figure 1 is a side elevation illustrating a portion of a tractor with my improved wheel scraping attachment mounted in position for practical use with respect to one of the wheels.
Figure 4:
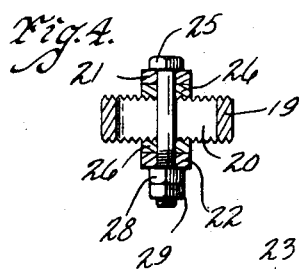
Figure 4 is a sectional view on the line 4—4 of Figure 1.
Figure 5:
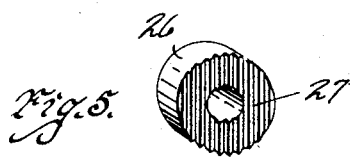
Figure 5 is a perspective view of one of the serrated washers employed in the device.
Figure 3:
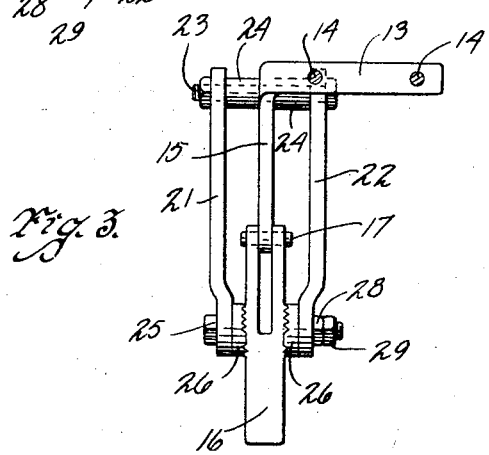
Figure 3 is a front elevation of the attachment on the line 3—3 of Figure 1.

It is well known that the wheels of tractors and other agricultural implements are apt to pick up and carry accumulations of earth, particularly when being used in plowed fields. This makes it desirable to provide scrapers or other means for removing the accumulations of earth from the wheels. However, it is difficult to use such scraping devices in cases where the wheels are provided with traction lugs.

My improved attachment is designed particularly for use with wheels of tractors or other agricultural implements equipped with the so-called spade type of lugs or lugs which are spaced apart in rows circumferentially of the wheel.

Traction wheels of this type, when used in certain kinds of soil, are at times liable to pick up stones or other obstructions along with the accumulations of soil and when such obstructions are encountered by a scraping device in engagement with the periphery of the wheel, some injury or breakage is apt to result. To overcome this difficulty I have equipped my improved scraping attachment with a frangible connection which will break when undue stress is placed upon the scraper and permit the blade to move to inoperative position out of contact with the wheel.

In the accompanying drawings I have shown a portion of a tractor of well known construction including a wheel 10 equipped with traction lugs 11 of the spade type. The wheel 10 is partially covered and protected by the usual fender 12.

A bracket is provided for carrying the scraper and this bracket preferably includes a transversely arranged member 13 which is fixed to the lower rear portion of the fender 12 by means of bolts 14. The bracket also includes an arm 15 which extends rearwardly from the transverse portion 13 and then forwardly and downwardly in an inclined direction toward the wheel 10.

A scraper blade 16 is provided which is narrow enough to be received between the rows of traction lugs 11. The blade 16 is connected to the lower end of the bracket arm 15 by means of a pin 17. The pin 17 preferably is of wood so that it will break when the blade encounters any unusual obstruction on the wheel.

At its rear end the blade 16 is formed with a substantially right-angled projection 18 which extends rearwardly and downwardly when the blade is in its normal operative position as shown in Figure 1. The projection 18 terminates in a transverse enlargement 19 which is formed with a longitudinal slot 20.

A pair of links, designated by the numerals 21 and 22, are mounted one on each side of the bracket arm 15 and are secured at their upper ends on a bolt 23 extending through said arm and provided with spacing sleeves 24 between said arm and the respective links.

At their lower ends the links 21 and 22 straddle the enlargement 19 and a bolt 25 extends through said links and through the slot 20 of said enlargement.

On the bolt 25 are mounted special washers 26, one between each of the links and the adjacent face of the enlargement 19. Each washer 26 is formed with a serrated face 27 to engage the adjacent face of the enlargement 19 which faces may also be serrated if desired.

The bolt 25 is provided with a nut 28 which is drawn up fairly tight whereby the blade 16 is normally held in the desired position of adjustment with its forward edge in suitable relation to the periphery of the wheel 10 between the rows of lugs 11. A lock nut 29 may also be mounted on the bolt 25 to maintain the desired adjustment.

The blade 16 is thus held in the required position for removing accumulations of earth from the periphery of the wheel thereby serving to maintain the efficiency of the traction lugs.

Figure 2:
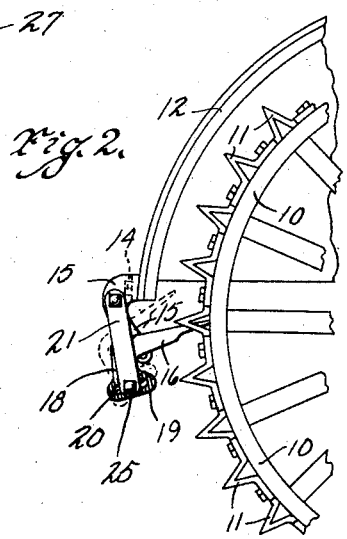
Figure 2 is a fragmentary side elevation illustrating the scraper blade as it is being carried to inoperative position after having been released by encountering an obstruction on the wheel.

In the event the blade 16 encounters an unusual or unyielding obstruction, such as a stone which may be imbedded in the accumulations of earth carried by the wheel, the increased stress will cause a breakage of the pin 17 and thus permit the blade to move first to the full line position of Figure 2 and thereafter to the dotted line position. This movement of the blade is permitted by the slot 20 and is caused by the forward travel of the wheel 10 in the advance of the machine.

It is apparent that I have thus provided a scraping attachment which is efficient in use and in which provision is made for guarding against injury to the parts.

The connection of the links 21 and 22 to the enlargement on the projection of the blade permits of securing and maintaining the desired adjustment of the blade with respect to the wheel and also permits the blade to swing upwardly and rearwardly as indicated when the pin 17 is broken by undue stress placed on the blade.

I claim as my invention:

1. A wheel scraper comprising a bracket, a scraper blade, a frangible connection between said blade and bracket, said blade being formed with an angular projection having a slot, a link attached to said bracket, and a bolt for securing said link to said projection through said slot, whereby the blade may be normally held in a suitable operative position and may move to inoperative position upon breakage of said frangible connection.

2. A wheel scraping attachment for a tractor having a fender and a wheel located beneath said fender, comprising a bracket adapted to be attached to said fender, said bracket having a downwardly extending arm, a blade, a frangible connection between said blade and the lower portion of said arm, said blade having a downwardly extending projection formed with a slot, a link attached to the upper part of said bracket arm, and a connection between said link and said projection through said slot for adjustably holding said blade in operative position relative to the wheel and for permitting it to swing to inoperative position upon breakage of said frangible connection.

3. A scraper attachment for tractor wheels, comprising a scraper blade, a support, a break-pin connection between said support and the rear portion of said blade, said blade being formed at its rear end with a substantially right angled projection, a link carried by said support, and a pivotal connection between said link and the right angled projection of said blade for permitting the blade to swing through an arc to inoperative position upon breakage of said pin.

Des Moines, Iowa June 13, 1929.

RAYMOND E. GARRETT.